(12) United States Patent
Miller

(10) Patent No.: US 7,437,391 B2
(45) Date of Patent: Oct. 14, 2008

(54) NUMERICALLY CONTROLLED OSCILLATOR AND METHOD OF OPERATION

(75) Inventor: Brian M. Miller, Liberty Lake, WA (US)

(73) Assignee: Agilent Technologies, Inc., Santa Clara, CA (US)

(*) Notice: Subject to any disclaimer, the term of this patent is extended or adjusted under 35 U.S.C. 154(b) by 710 days.

(21) Appl. No.: 10/867,025

(22) Filed: Jun. 14, 2004

(65) Prior Publication Data
US 2005/0278403 A1    Dec. 15, 2005

(51) Int. Cl.
*G06F 1/02* (2006.01)
(52) U.S. Cl. ..................................... 708/276
(58) Field of Classification Search .......... 708/270–277
See application file for complete search history.

(56) References Cited

U.S. PATENT DOCUMENTS

| | | | | |
|---|---|---|---|---|
| 4,855,946 A | * | 8/1989 | Ruben et al. ................. | 708/276 |
| 4,905,177 A | | 2/1990 | Weaver, Jr. et al. | |
| 5,276,633 A | * | 1/1994 | Fox et al. .................... | 708/276 |
| 5,321,642 A | * | 6/1994 | Goldberg .................... | 708/276 |
| 5,467,294 A | * | 11/1995 | Hu et al. ..................... | 708/276 |
| 5,737,253 A | | 4/1998 | Madisetti et al. | |
| RE36,388 E | * | 11/1999 | Fox et al. .................... | 708/276 |
| 6,587,862 B1 | * | 7/2003 | Henderson .................. | 708/276 |
| 6,807,554 B2 | * | 10/2004 | Vergel ........................ | 708/270 |
| 6,867,625 B1 | * | 3/2005 | Stoyanov .................... | 327/105 |

OTHER PUBLICATIONS

David A. Sunderland, Student Member IEEE, Roger A. Strauch, Steven S. Wharfield, Henry T. Peterson, and Christopher R. Cole, member, IEEE; "CMOS/SOS Frequency Synthesizer LSI Circuit For Spread Spectrum Communications"; IEEE Journal Of Solid-State Circuits, vol. SC-19, No. 4, Aug. 1984; pp. 497-506.

* cited by examiner

*Primary Examiner*—Tan V Mai

(57) ABSTRACT

In one embodiment, the present invention is directed to a numerically controlled oscillator. The numerically controlled oscillator comprises: a phase accumulator for receiving an input digital word; and a phase to amplitude converter that is operatively coupled to the phase accumulator to receive a first phase signal and a second phase signal, the phase to amplitude converter calculating a sine value and a cosine value of each of the first and second phase signals, the phase to amplitude converter generating a summation of (i) a product of the sine value of the first phase signal and the cosine value of the second phase signal and (ii) a product of the sine value of the second phase signal and the cosine value of the first phase signal.

18 Claims, 2 Drawing Sheets

NUMERICALLY CONTROLLED OSCILLATOR AND METHOD OF OPERATION

FIELD OF THE INVENTION

The present invention is related to a numerically controlled oscillator.

DESCRIPTION OF RELATED ART

A numerically (or digitally) controlled oscillator is an electronic system for synthesizing a range of frequencies in response to a digital signal. The range of frequencies generated by a numerically controlled oscillator is related to the bit resolution of the input digital signal and the clock used to control the numerically controlled oscillator. In particular, the generated frequencies are less than half of the frequency of the clock used to control the numerically controlled oscillator as a result of Nyquist's theorem.

FIG. 1 depicts numerically controlled oscillator 100 that is controlled by N-bit frequency word 102 (Freq(k)). Specifically, frequency word 102 defines the desired operating frequency of numerically controlled oscillator 100. Frequency word 102 is applied to phase accumulator 101 that is controlled by a clock to define the time base of oscillator 100. Phase accumulator 101 converts the input frequency data into phase signal 103 ($\Phi(k)$). Phase signal 103 is provided to phase-to-amplitude converter 104. Digital phase signal 103 is typically used as an index to a memory location in a read only memory (ROM) structure. The contents of the ROM structure at the respective location contains a digital value corresponding to sin ($\Phi(k)$) to generate digital amplitude signal 105. Digital amplitude signal 105 is provided to digital-to-analog converter 106 to generate an analog waveform whose frequency is related to frequency word 102.

If a relatively high degree of accuracy is desired, the use of a ROM structure to perform the phase to amplitude conversion requires an appreciably large amount of memory. Typically, implementations of phase to amplitude converter 104 truncate phase signal 103 (i.e., drop a number of the least significant bits) thereby reducing the amount of necessary memory. The truncation of phase signal 103 generates an error in digital amplitude signal 105. The error in digital amplitude signal 105 also generates spurs in the analog output signal.

A number of mechanisms have been implemented in an attempt to mitigate the error generated by truncation of phase signal 103. For example, an additional ROM can be programmed with an additive correction factor as described in U.S. Pat. No. 4,855,946. Alternatively, a power series expansion may be used to approximate the error as described in U.S. Pat. No. 4,905,177. A trigonometric expansion may be applied where combined terms of the trigonometric expansion are placed in respective ROMs for summation to construct an improved approximation as described in "CMOS/SOS Frequency Synthesizer LSI Circuit for Spread Spectrum Communications," David Sutherland et al., IEEE Journal of Solid-State Circuits, VOL SC-19, No. 4, August 1984. Also, a repetitive algorithm may be applied to generate an improved approximation as described in U.S. Pat. No. 5,757,253. Although all of these mechanisms mitigate the error associated with the truncation, a degree of error remains in digital amplitude signal 105. The error propagates through to the analog output signal.

SUMMARY

Representative embodiments are directed to numerically controlled oscillators and methods of operation. Representative embodiments enable a reduction in the total amount of memory used by ROM units of numerically controlled oscillators by utilizing a trigonometric identity. In one representative embodiment, a phase-to-amplitude converter receives a digital phase signal (represented by $\Phi$) from a phase accumulator. The received digital phase signal may be a truncation or may include all of the bits from the phase accumulator. The phase-to-amplitude converter includes a first set of ROM units for storing sine and cosine values corresponding to the most significant bits (represented by $\theta_c$) of $\Phi$. The phase-to-amplitude converter includes a second set of ROM units for storing sine and cosine values corresponding to the lesser significant bits (represented by $\theta_f$) of $\Phi$. The sine and cosine values retrieved by the ROM units are combined according to $\sin(\theta_c)\cdot\cos(\theta_f)+\sin(\theta_f)\cdot\cos(\theta_c)$ to generate a digital amplitude signal. Furthermore, the use of the trigonometric identity to reduce the amount of memory associated with the ROM units does not compromise the accuracy of the phase to amplitude conversion. Specifically, the use of the trigonometric identity does not involve any algorithmic error.

DETAILED DESCRIPTION

Figure 1:
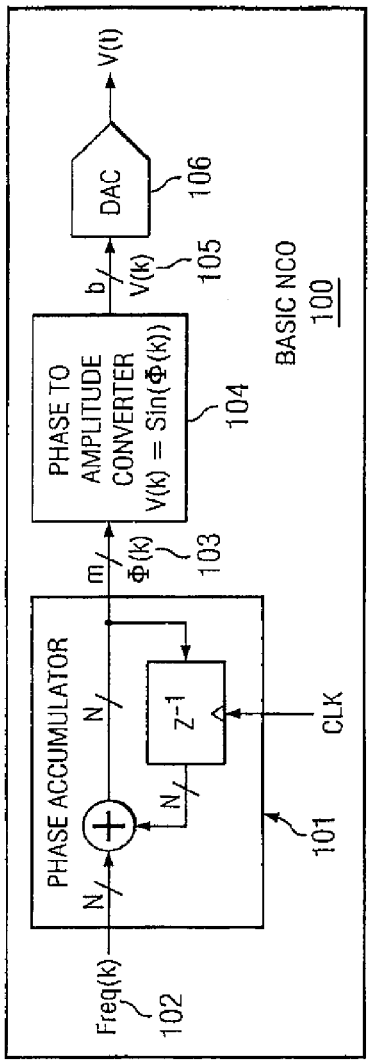
FIG. 1 depicts a known numerically controlled oscillator.
Figure 2:
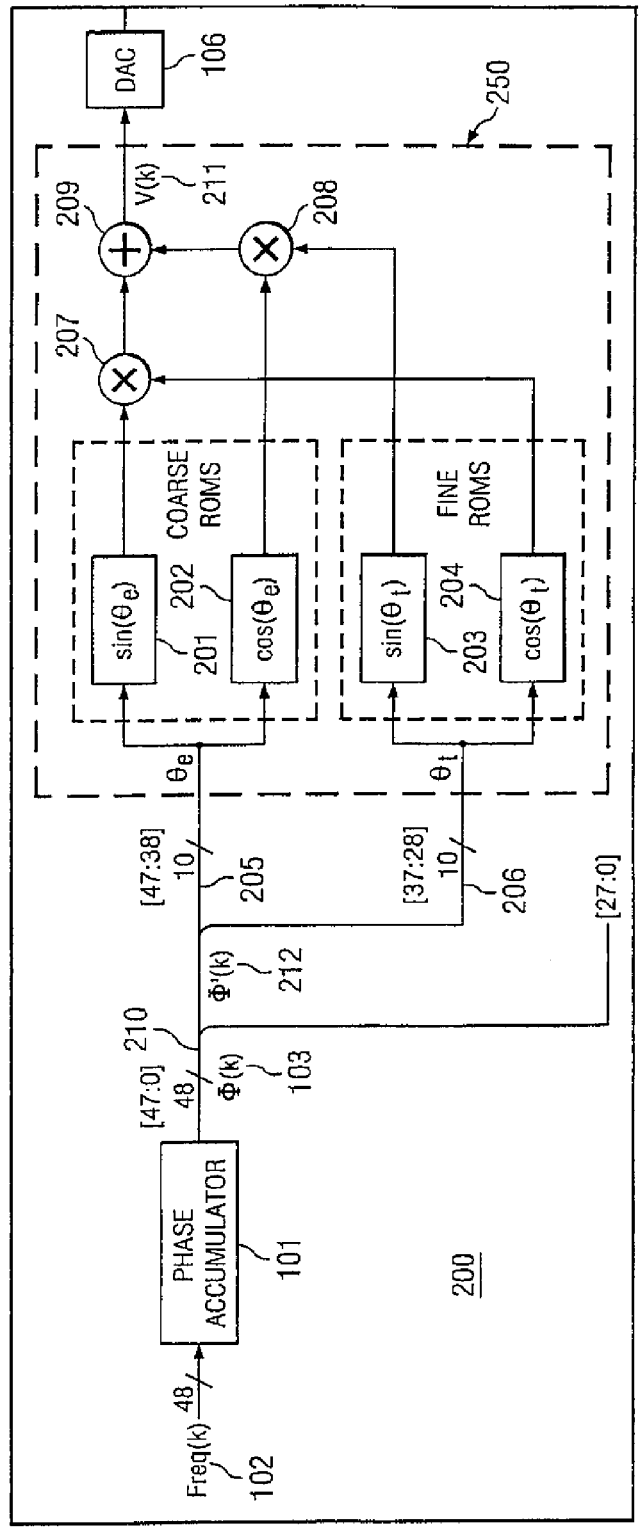
FIG. 2 depicts a numerically controlled oscillator according to one representative embodiment.

Referring now to one representative embodiment shown in FIG. 2, numerically controlled oscillator 200 receives input digital signal 102 (Freq(k)) to control the operating frequency of the oscillator. Input digital signal 102 is communicated using a bus having a bit width of 48-bits. Input digital signal 102 is accumulated by phase accumulator 101 to generate phase signal 103 ($\Phi(k)$). Phase signal 103 is communicated on bus 210 that has a width of 48-bits.

As shown in FIG. 2, phase signal 103 is truncated. Specifically, the lines of bus 210 corresponding to bits [27:0] are terminated without connection to phase-to-amplitude converter 250. Truncated signal 212 ($\Phi'(k)$) corresponds to bits [47:28]. The truncation occurs according to the desired level of accuracy associated with the subsequent phase-to-amplitude conversion. In an alternative embodiment, all of the bits from phase accumulator 101 could be used for the phase-to-amplitude conversion. As will be discussed in greater detail below, given the same number of bits used for the phase-to-amplitude conversion, representative embodiments enable a reduction in the amount of ROM memory without incurring any algorithmic error.

Furthermore, truncated signal 212 is separated into a "coarse" portion ($\theta_c$) and a "fine" portion ($\theta_f$). The lines of bus 210 corresponding to the "coarse" bits [47:38] and the lines corresponding to "fine" bits [37:28] are provided to separate components within phase-to-amplitude converter 250.

Phase-to-amplitude converter 250 enables a reduction in the size of ROM units 201-204 without loss of accuracy in the calculation of digital amplitude signal 211 (V(k)). Specifically, phase-to-amplitude converter 250 uses the trigonometric identity of equation (1).

$$\sin(\Phi')=\sin(\theta_c+\theta_f)=\sin(\theta_c)\cdot\cos(\theta_f)+\sin(\theta_f)\cdot\cos(\theta_c),$$
$$\text{where } \Phi'=\theta_c+\theta_f. \quad (1)$$

In the embodiment shown in FIG. 2, bits [47:28] of phase signal 103 are represented by Φ', the most significant bits of Φ' are represented by $\theta_c$, and the least significant bits of Φ' are represented by $\theta_f$. ROM unit 201 stores sine values corresponding to values defined by the most significant bits ($\theta_c$) of Φ'. Likewise, ROM unit 202 stores cosine values corresponding to values defined by the most significant bits ($\theta_c$) of Φ'. Accordingly, lines 205 of bus 210 associated with bits [47:38] are coupled to ROM units 201 and 202 to use the communicated bits as indices to retrieve the appropriate sine and cosine values. ROM units 203 and 204 respectively store the sine and cosine values associated with the least significant bits ($\theta_f$) of Φ'. Lines 206 of bus 210 associated with bits [37:28] are coupled to ROM units 203 and 204 to use the communicated bits as indices to retrieve the appropriate sine and cosine values.

Using the trigonometric identity of equation (1), the sine value from ROM unit 201 and the cosine value from ROM unit 204 are provided to multiplier 207. The sine value from ROM unit 203 and the cosine value from ROM unit 202 are provided to multiplier 208. The products from multipliers 207 and 208 are summed by adder 209 to generate digital amplitude signal 211 (V(k)). Digital amplitude signal 211 is converted into an analog signal by digital to analog converter (DAC) 106. Alternatively, other processing may occur before digital to analog conversion. For example, amplitude modulation may be performed in the digital domain if desired for a particular application. Similarly, phase modulation may be performed by suitably processing phase signal 103. Frequency modulation may be performed by suitably processing frequency input digital signal 102.

By implementing phase-to-amplitude converter 250 according to the representative embodiment shown in FIG. 2, ROM units 201-204 include an appreciably smaller amount of memory. Specifically, if a single ROM unit were employed to provide phase-to-amplitude conversion for a phase signal of N bits, the single ROM unit would require 2N entries. The implementation of phase-to-amplitude converter 250 uses four separate ROM units. Each of the four ROM units includes $_2$N/2 entries. Thus, the total amount of memory savings is $0.25*2^{N/2}=2^{N/2-2}$. For N=20, the reduction factor in the total amount of memory is 256. Also, known techniques for reducing memory requirement of ROM units using the symmetry of sinusoidal functions over zero to $2\pi$ may be used in addition to representative embodiments.

Moreover, the reduction in the total amount of memory occurs without any loss in accuracy. Specifically, equation (1) used by phase-to-amplitude converter 250 is a trigonometric identity and is not an approximation. Thus, the reduction in the amount of memory associated with ROM units 201-204 does not cause any error in the phase-to-amplitude conversion. In contrast, known approximation methods of reducing the amount of memory for phase-to-amplitude conversion involve intrinsic algorithmic error. By implementing numerically controlled oscillator 200 as shown in FIG. 2 and by using DAC 106 with suitable characteristics (accuracy, linearity, settling characteristics, time characteristics, and the like), spurious levels on the order of −90 dBc or better may be achieved for operation at 100 MHz or greater. The bit resolution of the various digital signals shown in FIG. 2 are not essential for spurious level reduction. Other suitable bit selections may be made according to representative embodiments as appropriate for particular applications.

Figure 3:
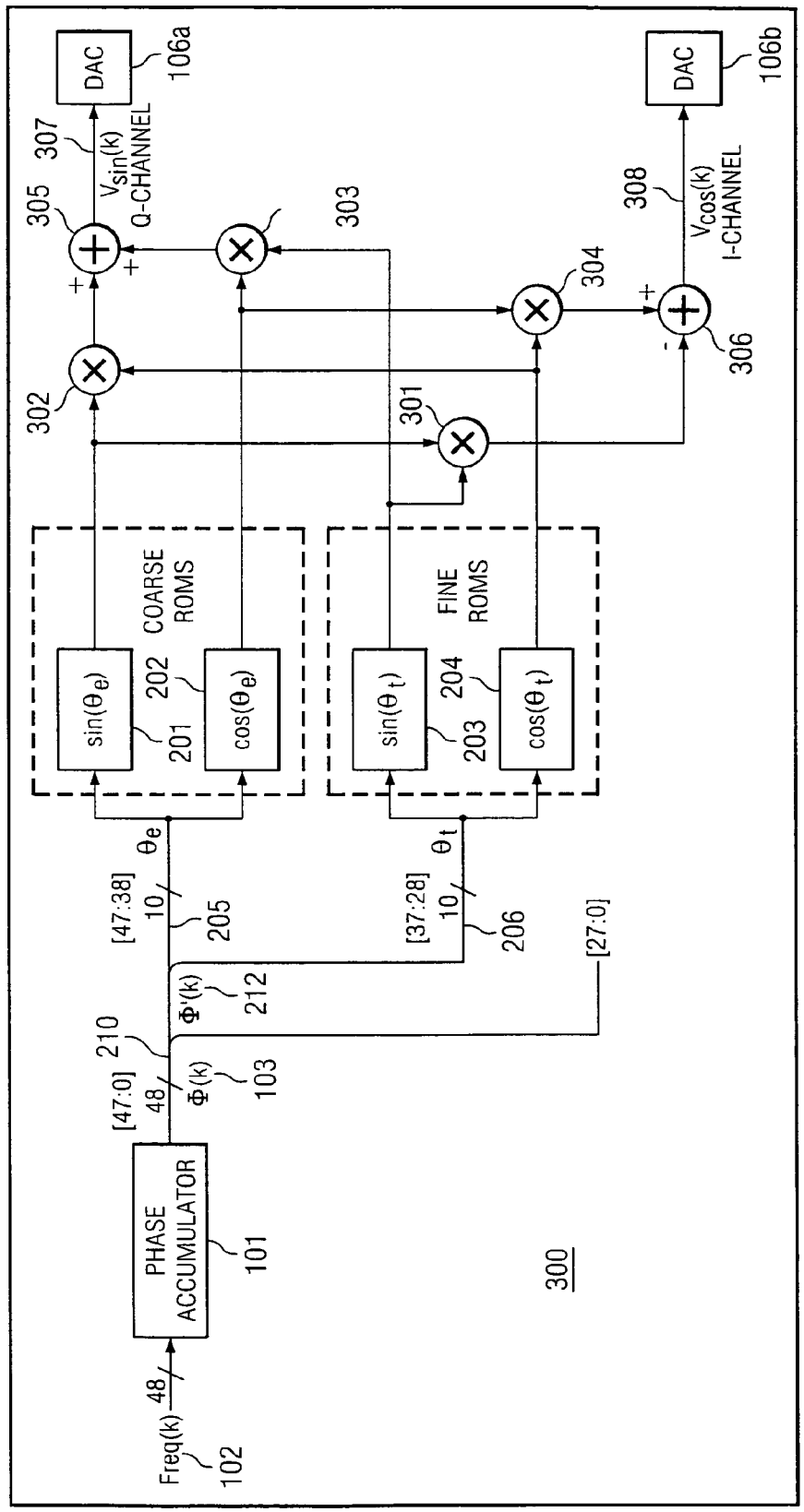
FIG. 3 depicts an IQ numerically controlled oscillator according to another representative embodiment.

FIG. 3 depicts IQ numerically controlled oscillator 300 according to one representative embodiment. The front end of IQ numerically controlled oscillator 300 is similar to the front end of numerically controlled oscillator 200. The outputs of IQ numerically controlled oscillator 300 differ from the output of numerically controlled oscillator 200. Specifically, IQ numerically controlled oscillator 300 provides a Q-channel (V sin(k) 307) and an I-channel (V cos(k) 308). The arrangement of IQ numerically controlled oscillator 300 is efficient, because additional ROM units are not required to generate the I and Q channels. By using the same ROM units to create the I and Q channels, the memory reduction as compared to a single ROM look-up implementation is further improved to $2^{N/2-1}$.

To calculate the I and Q channels in the digital domain, the outputs of ROM units 201 and 203 are provided to multiplier 301. The outputs of ROM units 201 and 204 are provided to multiplier 302. The outputs of ROM units 201 and 204 are provided to multiplier 302. Also, the output of ROM unit 202 and ROM unit 203 are provided to multiplier 303. The output of ROM unit 203 and ROM unit 201 are provided to multiplier 304. The output of ROM unit 204 and ROM unit 202 are provided to multiplier 304. The Q-channel (V sin(k) 307) is generated by adder 305 using the outputs of multipliers 302 and 303. The I-channel (V cos(k) 308) is generated by adder 306 which sums the negative value of the output of multiplier 301 with the output of multiplier 304. Digital to analog conversion is performed for the Q-channel by DAC 106a. Likewise, digital to analog conversion is performed for the I-channel by DAC 106b Other suitable signal processing may occur in the digital domain before digital to analog conversion as appropriate for a particular application.

Representative embodiments enable a reduction in the total amount of memory used for ROM units for numerically controlled oscillators. Representative embodiments further enable phase-to-amplitude conversion to occur in a more accurate manner by using a trigonometric identity instead of a numerical approximation. Furthermore, the accuracy associated with the phase-to-amplitude conversion mitigates spurs exhibited in analog signals derived from numerically controlled oscillators.

What is claimed is:

1. A numerically controlled oscillator producing an oscillator output signal, said oscillator comprising:

a phase accumulator for receiving an input digital word and producing a digital output signal in relation to said input digital word; and a phase to amplitude converter that is operatively coupled to said phase accumulator to receive a first phase signal and a second phase signal, said digital output signal comprising a first set of bits corresponding to said first phase signal, a second set of bits corresponding to said second phase signal, and a third set of bits comprising at least the least significant bit of said digital output signal, said phase to amplitude converter calculating a sine value and a cosine value of each of said first and second phase signals, said phase to amplitude converter generating a summation of (i) a product of the sine value of said first phase signal and the cosine value of said second phase signal and (ii) a product of the sine value of said second phase signal and the cosine value of the first phase signal, wherein said phase to amplitude converter outputs said summation as an amplitude signal; wherein said third set of bits is not used in generating said oscillator output signal.

2. The numerically controlled oscillator of claim 1 wherein said first phase signal includes a plurality of most significant bits of said digital output signal from said phase accumulator and said second phase signal includes a plurality of lesser significant bits of said digital output signal from said phase accumulator.

3. The numerically controlled oscillator of claim 1 wherein said phase to amplitude converter comprises:
a plurality of read only memory (ROM) units for retrieving the sine and cosine values.

4. A method of generating an oscillator signal using a digital circuit, comprising:
operating accumulator logic in response to an input digital signal to generate a first digital phase signal;
apportioning a segment of said first digital phase signal into second and third digital phase signals and apportioning the remain bits including the least significant bit of said first digital phase signal into a set of truncation bits;
calculating first sine and cosine values for said second digital phase signal;
calculating second sine and cosine values for said third digital phase signal; and
operating an adder to sum (i) a product of said first sine value and said second cosine value and (ii) a product of said second sine value and said first cosine value to generate an output digital value to generate a digital amplitude signal;
wherein said set of truncation bits is not used in generating said oscillator output signal.

5. The method of claim 4 further comprising:
operating a digital to analog converter to convert said output digital value to generate said oscillator signal.

6. The method of claim 4 wherein said apportioning includes selecting a first plurality of bits that are most significant bits of said first digital phase signal for said second digital phase signal.

7. The method of claim 6 wherein said apportioning includes selecting a second plurality of bits adjacent to said most significant bits of said first digital phase signal for said third digital phase signal.

8. The method of claim 7 wherein said calculating first sine and cosine values and calculating second sine and cosine values includes retrieving values stored in read only memory (ROM) units using said second and third phase signals as indices to locations within said ROM units.

9. A numerically controlled oscillator producing an output signal, said oscillator comprising:
means for accumulating a digital signal to generate a first digital phase signal; and
means for generating a digital amplitude signal using second and third digital phase signals derived from less than all of said first digital phase signal, wherein said means for generating calculates said digital amplitude signal as a summation of (i) a product of a sine value of said second digital phase signal and a cosine value of said third digital phase signal and (ii) a product of a sine value of said third digital phase signal and a cosine value of said second digital phase signal;
wherein at least the least most significant bit of said first digital phase signal is not used to produce said output signal.

10. The numerically controlled oscillator of claim 9 further comprising:
a bus, coupled to said means for accumulating, for communicating said first digital phase signal.

11. The numerically controlled oscillator of claim 10 wherein a first plurality of lines of said bus are coupled to a first sine calculation element and a first cosine calculation element and a second plurality of lines of said bus are coupled to a second sine calculation element and a second cosine calculation element.

12. The numerically controlled oscillator of claim 11 wherein said first and second sine calculation elements and said first and second cosine calculation elements comprise respective read only memory (ROM) units.

13. The numerically controlled oscillator of claim 12 wherein said first and second sine calculation elements and said first and second cosine calculation elements use bits received on said first and second plurality of lines of said bus as indices to retrieve values stored in locations of said ROM units.

14. A system providing an oscillator output signal, comprising:
a phase accumulator for receiving an input digital word and providing a digital output word, said digital output word being divided into truncated output word and a remainder word comprising at least the least significant bit of said digital output word; and
a phase to amplitude converter that is operatively coupled to said phase accumulator to receive said truncated output word from said phase accumulator, said truncated output word forming a first phase signal and a second phase signal, said phase to amplitude converter calculating first sine and cosine values of said first phase signal and second sine and cosine values of said second phase signal, said phase to amplitude converter summing (i) a product of said first sine value and said second cosine value and (ii) a product of said second sine value and said first cosine value to generate a first output signal, said phase to amplitude converter subtracting (i) a product of said first and second sine values from (ii) a product of said first and second cosine values to generate a second output signal, wherein said remainder word is not used to generate said oscillator output signal.

15. The system of claim 14 further comprising:
a plurality of read only memory (ROM) units storing sine and cosine values.

16. The system of claim 15 wherein said first phase signal is defined by a plurality of most significant bits of an output signal from said phase accumulator and said second phase signal is defined by a plurality of lesser significant bits of said output signal from said phase accumulator.

17. The system of claim 16 wherein a first pair of said plurality of ROM units stores sine and cosine values corresponding to said most significant bits and a second pair of said plurality of ROM units stores sine and cosine values corresponding to said lesser significant bits.

18. The system of claim 14 further comprising:
a first digital to analog converter for converting the first output signal into an analog signal;
a second digital to analog converter for converting the second output signal into an analog signal.

* * * * *